United States Patent
Tenny et al.

(10) Patent No.: US 10,979,934 B2
(45) Date of Patent: *Apr. 13, 2021

(54) SYSTEM AND METHOD FOR MAINTAINING SYNCHRONIZATION IN CONNECTIONLESS TRANSMISSIONS

(71) Applicant: Futurewei Technologies, Inc., Plano, TX (US)

(72) Inventors: Nathan Edward Tenny, San Diego, CA (US); Xiaoxiao Zheng, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,939

(22) Filed: Nov. 22, 2019

(65) Prior Publication Data

US 2020/0092751 A1 Mar. 19, 2020

Related U.S. Application Data

(63) Continuation of application No. 15/484,540, filed on Apr. 11, 2017, now Pat. No. 10,492,099.

(Continued)

(51) Int. Cl.
*H04W 28/06* (2009.01)
*H04W 76/27* (2018.01)
(Continued)

(52) U.S. Cl.
CPC ......... *H04W 28/065* (2013.01); *H04W 76/10* (2018.02); *H04W 76/27* (2018.02); *H04W 76/30* (2018.02)

(58) Field of Classification Search
CPC .... H04W 28/065; H04W 76/27; H04W 76/10
See application file for complete search history.

(56) References Cited

U.S. PATENT DOCUMENTS

| | | |
|---|---|---|
| 6,683,860 B1 | 1/2004 | Forssell et al. |
| 6,718,179 B1 | 4/2004 | Forssell et al. |

(Continued)

FOREIGN PATENT DOCUMENTS

| | | |
|---|---|---|
| CN | 101651517 A | 2/2010 |
| CN | 101651605 A | 2/2010 |

(Continued)

OTHER PUBLICATIONS

3rd Generation Partnership Project; Technical Specification Group Services and System Aspects; General Packet Radio Service (GPRS); Service description, Stage 1 (Release 5); 3GPP TS 22.060, V5.3.0, Mar. 2003, 26 pages.

(Continued)

*Primary Examiner* — Afshawn M Towfighi
(74) *Attorney, Agent, or Firm* — Slater Matsil, LLP

(57) ABSTRACT

A method for operating a receiving device includes receiving a first protocol data unit (PDU) of a first burst transmission, the first PDU includes a first transmission identifier (T_ID) associated with the first burst transmission, and the first PDU further includes a final PDU indication indicating that the first PDU is a final PDU of the first burst transmission, and releasing a first radio link control (RLC) resource associated with the first T_ID when the first RLC resource associated with the first T_ID exists.

20 Claims, 9 Drawing Sheets

Related U.S. Application Data

(60) Provisional application No. 62/334,740, filed on May 11, 2016.

(51) Int. Cl.
*H04W 76/10* (2018.01)
*H04W 76/30* (2018.01)

(56) References Cited

U.S. PATENT DOCUMENTS

| | | | |
|---|---|---|---|
| 7,054,268 | B1 | 5/2006 | Arantainen et al. |
| 7,567,537 | B1 | 7/2009 | Gurbuz et al. |
| 10,492,099 | B2 * | 11/2019 | Tenny .................. H04W 76/27 |
| 2002/0082033 | A1 | 6/2002 | Lohtia et al. |
| 2003/0217318 | A1 | 11/2003 | Choi |
| 2010/0278105 | A1 | 11/2010 | Diachina et al. |
| 2011/0222450 | A1 | 9/2011 | Youssef et al. |
| 2012/0002619 | A1 | 1/2012 | Kim et al. |
| 2012/0014366 | A1 | 1/2012 | Kim et al. |
| 2014/0206372 | A1 | 7/2014 | Zeng et al. |
| 2015/0334669 | A1 * | 11/2015 | Zhang ............... H04W 56/0045 370/336 |
| 2017/0127471 | A1 | 5/2017 | Yu et al. |
| 2017/0215218 | A1 | 7/2017 | Adachi et al. |

FOREIGN PATENT DOCUMENTS

| | | |
|---|---|---|
| CN | 101686184 A | 3/2010 |
| CN | 102422704 A | 4/2012 |
| EP | 1101374 B1 | 10/2006 |
| JP | 2000209301 A | 7/2000 |
| JP | 2002525940 A | 8/2002 |
| JP | 2002539680 A | 11/2002 |
| JP | 2014532340 A | 12/2014 |
| KR | 20020073516 A | 9/2002 |
| KR | 100414311 | 1/2004 |
| RU | 2484587 C1 | 6/2013 |
| WO | 9617462 A2 | 6/1996 |
| WO | 0158095 A1 | 8/2001 |
| WO | 2010054391 A2 | 5/2010 |
| WO | 2015139773 A1 | 9/2015 |
| WO | 2016013590 A1 | 1/2016 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Releasee 8)," 3GPP TS 36.300, V8.12.0, Mar. 2010, 149 pages.

3rd Generations Partnership Project; Technical Specification Group GSM/EDGE Radio Access Network; General Packet Radio Serive (GPRS); Overall description of the GRPS radio interface; Stage 2 (Release 13), 3GPP TS 43.064 V13.0.0, Nov. 2015, 113 pages.

International Telecommunication Union, "Series Q: Switching and Signalling, Specifications of Signalling System No. 7—Signalling connection control part (SCCP), Functional description of the signalling connection control part," ITU-T, Telecommunication Standardization Sector of ITU, Q.711, Mar. 2001, 41 pages.

Ratnam, et al., "WTCP: An Efficient Mechanism for Improving Wireless Access to TCP Services," International Journal of Communications Systems, Int. J. Commun. Syst. 2002; 00:1-15, Sep. 18, 2002, 16 pages.

Ericsson, "Resource release of common E-DCH in CELL_FACH," 3GPP TSG RAN WG2 #bis, Tdoc R2-080044, Sevilla, Spain, Jan. 14-18, 2008, 2 pages.

3GPP TS 25322 V13.0.0 (Dec. 2015), "3rd Generation Partnership Project; Technical Specification Group Radio Acces Network; Radio Link Control (RLC) protocol specification,"(Release 13), 90 pages.

* cited by examiner

SYSTEM AND METHOD FOR MAINTAINING SYNCHRONIZATION IN CONNECTIONLESS TRANSMISSIONS

This application is a Continuation of U.S. patent application Ser. No. 15/484,540, filed on Apr. 11, 2017, entitled "System and Method for Maintaining Synchronization in Connectionless Transmissions," which claims the benefit of U.S. Provisional Application No. 62/334,740, filed on May 11, 2016, entitled "System and Method for Maintaining Synchronization in Connectionless Transmissions," all of which applications are hereby incorporated herein by reference.

TECHNICAL FIELD

The present disclosure relates generally to a system and method for digital communications, and, in particular embodiments, to a system and method for maintaining synchronization in connectionless transmissions.

BACKGROUND

Proposals in many technical standards, such as the Third Generation Partnership Project (3GPP) Long Term Evolution (LTE), narrow-band Internet of Things (NB-IoT), and fifth generation (5G) have raised the possibility of some form of connection-free burst transmissions between a user equipment (UE) and an entity in a communications network (or simply, the network). Generally, these techniques rely on end-to-end security between the UE and a non-access stratum (NAS) context maintained for the UE in a core network node, such as a mobility management entity (MME), to avoid the overhead associated with establishing and maintaining an access stratum (AS) context for the UE at an access node, such as a base station or evolved NodeB (eNB).

Because the NAS context is persistent across instances of the burst transmission, the state information of the NAS context needs to remain synchronized between the UE and the network, not only during a single transmission but also after the burst transmission is complete. In particular, when information from the NAS context (e.g., a NAS sequence number) is used as a cryptosync, the information must remain reliably synchronized or else incorrect decryption will occur. The loss of synchronization may not be detectable, leading to the delivery of garbage data to the application layer. The synchronization requirement results in a need for reliable delivery, e.g., by using an automatic repeat request (ARQ) mechanism in Layer 2.

SUMMARY

Example embodiments provide a system and method for maintaining synchronization in connectionless transmissions.

In accordance with an example embodiment, a method for operating a receiving device is provided. The method includes receiving, by the receiving device, a first protocol data unit (PDU) of a first burst transmission, the first PDU including a first transmission identifier (T_ID) associated with the first burst transmission, and the first PDU further including a final PDU indication indicating that the first PDU is a final PDU of the first burst transmission, and releasing, by the receiving device, a first radio link control (RLC) resource associated with the first T_ID when the first RLC resource associated with the first T_ID exists.

The method also includes sending, by the receiving device, an acknowledgement for the first PDU. The method also includes receiving, by the receiving device, a second PDU of a second burst transmission, the second PDU including a second T_ID associated with the second burst transmission, establishing, by the receiving device, a second RLC resource associated with the second T_ID when the second T_ID is a new T_ID, and indicating, by the receiving device, an error condition when the second T_ID is an old T_ID and when the second T_ID does not have an associated RLC resource.

The method also includes updating, by the receiving device, the second T_ID as an old T_ID. The first burst transmission and the second burst transmission are one and the same. The method also includes sending, by the receiving device, an acknowledgement for the second PDU. The acknowledgement and the error condition are sent in a single PDU. Establishing the second RLC resource includes establishing an RLC entity associated with the second burst transmission. The receiving device includes one of a user equipment (UE) in a downlink burst transmission or an access node in an uplink burst transmission.

In accordance with an example embodiment, a method for operating a transmitting device is provided. The method includes establishing, by the transmitting device, a RLC resource associated with a T_ID of a burst transmission, sending, by the transmitting device, a first PDU of the burst transmission, the first PDU includes the T_ID and a final PDU indication indicating that the first PDU is a final PDU of the burst transmission, and releasing, by the transmitting device, the RLC resource associated with the T_ID when the transmitting device receives one of an acknowledgement for the first PDU or an error indication associated with the burst transmission.

The method also includes sending, by the transmitting device, a second PDU of the burst transmission, the second PDU including the T_ID. The second PDU further includes an initial PDU indication indicating that the second PDU is an initial PDU of the burst transmission. The transmitting device includes one of a UE in an uplink burst transmission or an access node in a downlink burst transmission.

In accordance with an example embodiment, a receiving device is provided. The receiving device includes one or more processors, and a computer readable storage medium storing programming for execution by the one or more processors. The programming including instructions to configure the receiving device to receive a first PDU of a first burst transmission, the first PDU includes a first T_ID associated with the first burst transmission, and the first PDU further includes a final PDU indication indicating that the first PDU is a final PDU of the first burst transmission, and release a first RLC resource associated with the first T_ID when the first RLC resource associated with the first T_ID exists.

The programming includes instructions to configure the receiving device to send an acknowledgement for the first PDU. The programming includes instructions to configure the receiving device to receive a second PDU of a second burst transmission, the second PDU including a second T_ID associated with the second burst transmission, establish a second RLC resource associated with the second T_ID when the second T_ID is a new T_ID, and indicate an error condition when the second T_ID is an old T_ID and when the second T_ID does not have an associated RLC resource. The programming includes instructions to configure the receiving device to update the second T_ID as an old T_ID.

The programming includes instructions to configure the receiving device to send an acknowledgement for the second PDU.

In accordance with an example embodiment, a transmitting device is provided. The transmitting device includes one or more processors, and a computer readable storage medium storing programming for execution by the one or more processors. The programming including instructions to configure the transmitting device to establish a RLC resource associated with a T_ID of a burst transmission, send a first PDU of the burst transmission, the first PDU includes the T_ID, and a final PDU indication indicating that the first PDU is a final PDU of the burst transmission, and release the RLC resource associated with the T_ID when the transmitting device receives one of an acknowledgement for the first PDU or an error indication associated with the burst transmission.

The programming includes instructions to configure the transmitting device to send a second PDU of the burst transmission, the second PDU includes the T_ID.

Practice of the foregoing embodiments prevents the occurrence of an out of synchronization condition between a sending device and a receiving device communicating using burst transmissions. The out of synchronization condition can result in the receiving device being unable to decrypt received data, thereby making the data transmissions useless.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
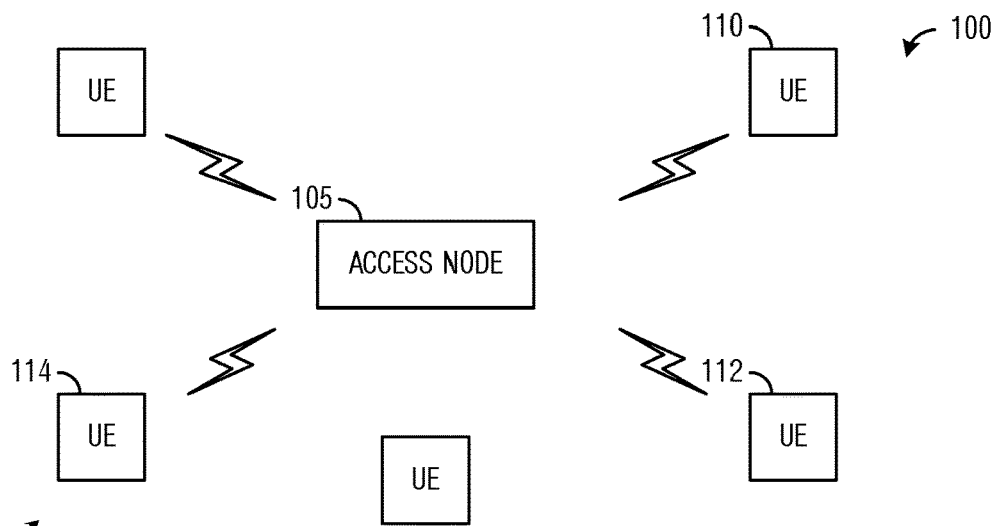
FIG. 1 illustrates an example communications system.

FIG. 1 illustrates an example communications system 100. Communications system 100 includes an access node 105, such as a Node B, an eNB, a base station, a controller, an access point, a gNode B (gNB), and so on. In a cellular mode of operation, access node 105 controls communications to and from UEs, such as UE 110, UE 112, and UE 114, by granting network resources to the communications. UEs may also be commonly referred to as station, mobile station, mobile, user, subscriber, terminal, and so on. In a direct mode of operation, UEs can communicate directly with one another without having access node 105 as intermediary. As an example, a UE can communicate with other UEs without having to transmit to or receive from access node 105. UEs may also be commonly referred to as mobile stations, mobiles, subscribers, terminals, users, stations, and so on. While it is understood that communications systems may employ multiple access node capable of communicating with a number of UEs, only one access node, and five UEs are illustrated for simplicity.

In a typical uplink burst transmission between a UE and an access node, there is reduced or no random access procedure. The random access procedure, if performed, may be used for obtaining uplink timing or to identify the UE. The random access procedure may also be used to establish routing for user data, such as in the selecting of a MME, if needed. Generally, the UE transmits a small amount of data, on the order of one Internet Protocol (IP) packet. The data is encrypted with the NAS security context. The transmission may correspond to one or several radio link control (RLC) protocol data units (PDUs) depending on the Layer 2 configuration. After the transmission completes, no AS context is maintained and the UE goes back to idle state. Burst transmissions are also commonly referred to as short transmissions.

In order to facilitate the discussion of the example embodiments, the following assumptions are made:

A UE-access node link uses some form of Layer 2 ARQ mechanism, implying that the transmission is not truly connectionless because there is some RLC context. The transmission may be characterized as being semi-connectionless.

A UE-core network (CN) link handles security, using a counter based mechanism, such as a cryptosync, for example.

No explicit connection maintenance signaling, such as connection setup, configuration, or release messaging, is performed.

The access node is able to recognize the final PDU of a burst.

Figure 2:
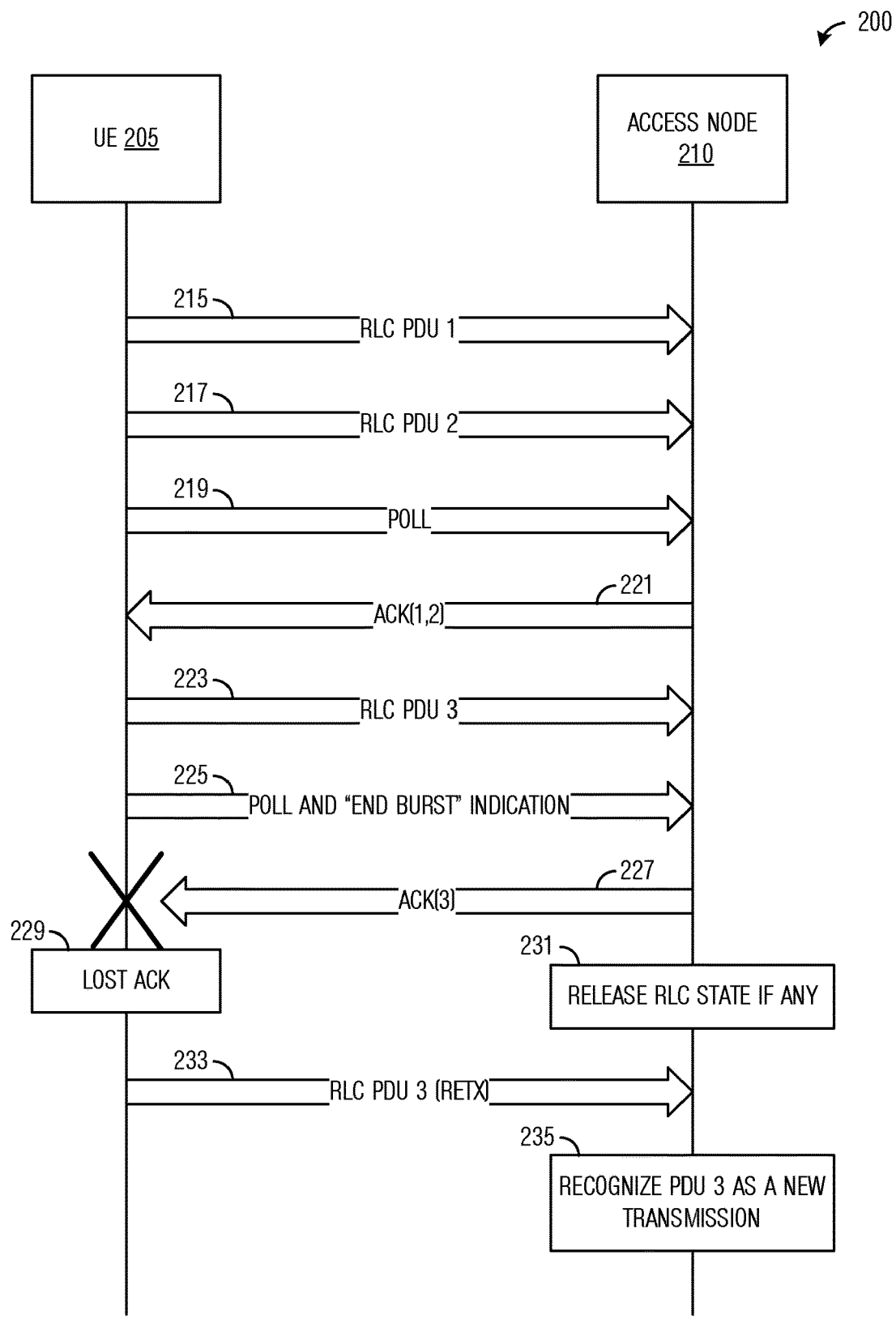
FIG. 2 illustrates a diagram of messages exchanged and processing performed during an uplink burst transmission between an UE and an access node according to embodiments presented herein.

If RLC procedures as specified in the 3GPP LTE technical standards are used, a majority of a burst transmission will work. However, an out-of-sync condition may occur in the final PDU of a burst. The problem arises when an acknowledgment (ACK) for the final PDU is lost, which is shown in FIG. 2. FIG. 2 illustrates a diagram 200 of messages exchanged and processing performed during an uplink burst transmission between an UE 205 and an access node 210. UE 205 sends PDU1 (event 215) and PDU2 (event 217) to access node 210. UE 205 also sends a poll indication to request acknowledgement (event 219). Although the poll indication is shown in FIG. 2 as a separate event, it should be appreciated that in practice it may be combined with other events in a single message, for example by setting a polling flag in a header of PDU2. Access node 210 sends an acknowledgement for PDU1 and PDU2 (event 221), such as an RLC STATUS PDU. UE 205 sends PDU3, which happens to be the final PDU of the burst transmission (event 223). UE 205 also sends a poll indication and an "END BURST" indication (event 225). Access node 210 sends an acknowledgement for PDU3 (event 227). However, the acknowledgment for PDU3 is lost. Therefore, UE 205 never receives the acknowledgement for PDU3 (block 229). However, access node 210 assumes that UE 205 successfully receives the acknowledgement for PDU3 and releases RLC state associated with the burst transmission, if any (block 231). UE 205 assumes that access node 210 did not receive PDU3 and resends PDU3 (event 233). Access node 210 receives the resent PDU3 but interprets the resent PDU3 as a new burst transmission because the RLC state associated with the burst transmission has been released (block 235). Therefore, an out-of-sync condition has arisen between UE 205 and access node 210. It is noted that the same situation is possible in downlink transmissions, with only the roles of the communicating devices reversed.

Figure 3:
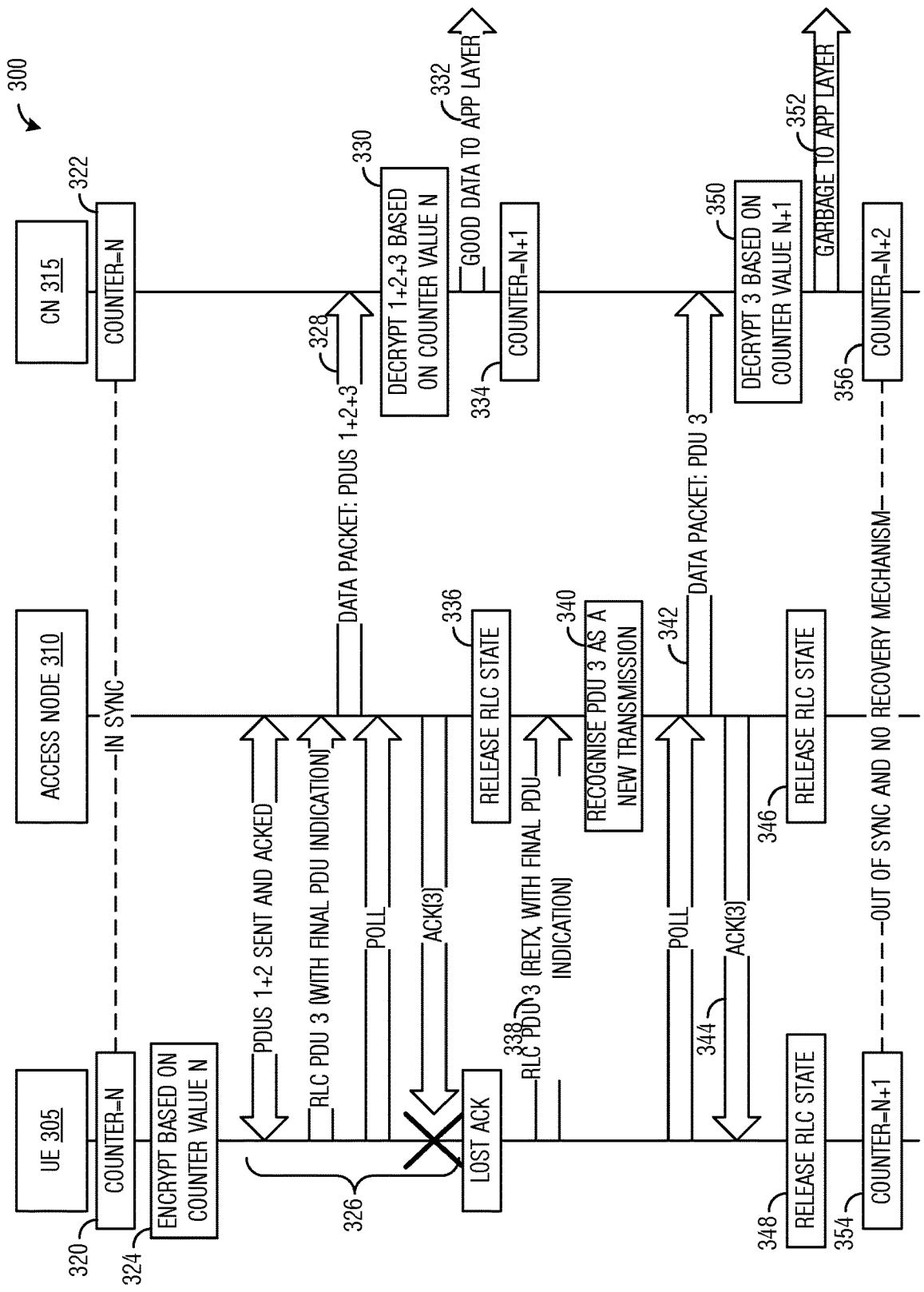
FIG. 3 illustrates a diagram of messages exchanged and processing performed during an uplink burst transmission highlighting a cryptosync problem according to embodiments presented herein.

FIG. 3 illustrates a diagram 300 of messages exchanged and processing performed during an uplink burst transmission highlighting a cryptosync problem. Diagram 300 illustrates messages exchanged and processing performed by a UE 305, an access node 310, and a CN 315. Initially, cryptosync counters at UE 305 and CN 315 are synchronized with the same value N (blocks 320 and 322). UE 305 uses the value N to encrypt data sent in the short burst (block 324). UE 305 sends PDUs 1, 2, and 3 to access node 310, which is able to successfully acknowledge PDUs 1 and 2 but acknowledgement associated with PDU3 is lost (events 326). Access node 310 sends PDUs 1, 2, and 3 to CN 315 (event 328), which is able to successfully decrypt the PDUs using the value N (block 330) producing good data that is forwarded to the application layer (event 332). CN 315 increments the cryptosync counter to N+1 (block 334) and access node 310 releases RLC state associated with the burst transmission (block 336).

However, UE 305 never received the acknowledgement for PDU3, so it does not increment the cryptosync counter and instead resends PDU3 (event 338). Access node 310 interprets the resent PDU3 as a new transmission since RLC state has been released (block 340). Access node 310 also forwards PDU3 to CN 315 (event 342) and acknowledges PDU3 (event 344). Access node 310 releases the RLC state (block 346) and upon receipt of the acknowledgment for PDU3, UE 305 releases the RLC state (block 348). Upon receipt of PDU3 from access node 310, CN 315 decrypts PDU3 in accordance with the value N+1 (block 350), which results in garbage data being forwarded to the application layer (event 352) because PDU3 was encrypted in accordance with the value N (block 324, supra). Both UE 305 and CN 315 increment their respective cryptosync counters to N+1 for UE 305 (block 354) and N+2 for CN 315 (block 356). The two cryptosync counters are out of sync with no recovery mechanism.

In general, the out-of-sync problems discussed above is not an issue in connectionful settings (transmissions occurring over established connections) because connectionful transmissions feature supervisory Layer 3 signaling that is delivered reliably, e.g., by RLC acknowledged mode (AM) operation. The release of such a connection requires a handshake on both sides of the connection before contexts are deleted, therefore, late retransmissions after connection release cannot occur. In rare instances where a late retransmission does occur, the receiving device would simply treat the retransmission as invalid data, because with no connection setup procedure associated with the late retransmission, there would be no protocol stack to process the late retransmission.

In the burst transmission scenario without an established connection, the out-of-sync problems may be fixed as follows:

Maintaining some of the existing protocol state information so that a late retransmission can be recognized as being invalid and properly handled; or Adding additional information to prevent or to detect late retransmissions.

Figure 4:
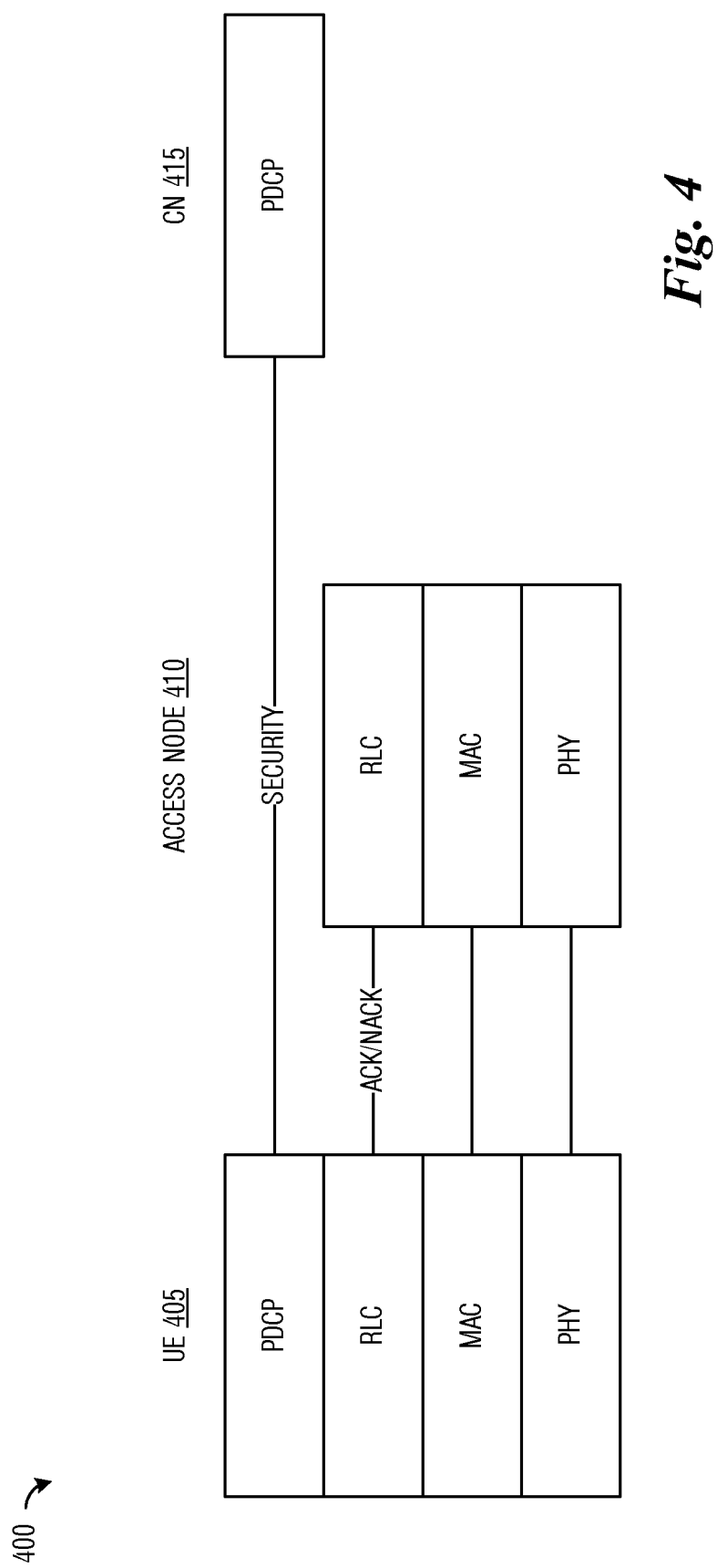
FIG. 4 illustrates example protocol stacks at a UE, an access node, and a CN according to embodiments presented herein.

FIG. 4 illustrates example protocol stacks 400 at a UE 405, an access node 410, and a CN 415. The protocol stack at UE 405 includes a physical (PHY) layer entity, a medium access control (MAC) layer entity, a RLC entity, and a packet data convergence protocol (PDCP) entity. The protocol stack at access node 410 includes a PHY layer entity, a MAC layer entity, and a RLC entity. The protocol stack at CN 415 includes a PDCP entity. The RLC entities of UE 405 and access node 410 exchange acknowledgments and ensure reliable delivery between UE 405 and access node 410. The RLC entities may segment packets, but packet segmentation is not necessary. A model similar to 3GPP LTE is shown, using polling and status PDUs for acknowledgements. Other Layer 2 acknowledgement models may alternatively be used without substantive changes to the example embodiments presented herein. In general, both devices consider that a Layer 2 acknowledgement for all RLC PDUs in a burst implies that the burst has been delivered. The PDCP entities of UE 405 and CN 415 provide security for the burst transmissions. Each PDCP PDU is assumed to comprise one burst of data with no segmentation or concatenation. The cryptosync is maintained in the PDCP entities, using PDCP sequence numbers or something similar, for example.

The discussion presented herein utilizes names and procedures from the 3GPP LTE technical standard. However, the example embodiments are operable with any communications system that supports burst transmissions. Therefore, the use of names and procedures associated with 3GPP LTE should not be construed as being limiting to either the scope or the spirit of the example embodiments.

There may be several ways to maintain state information after a burst transmission. They include:

Alternative 1: Use an existing PDCP context in the CN.

The use of the existing PDCP context enables duplicate detection in the PDCP entity;

In the example scenario discussed previously in FIG. 3, PDU3 should be recognized as a duplicate PDU by the CN, based on repeated information such as a PDCP sequence number (SN);

However, assuming the PDCP SN is near the beginning of the PDCP service data unit (SDU) as in LTE, PDU3 does not contain the PDCP SN, PDU1 contains the PDCP SN, so duplicate detection for PDU3 would not in fact be possible;

Accordingly, the solution using an existing PDCP context will work in situations where there is no RLC segmentation, so that each RLC SDU contains the PDCP SN; and For a version of this solution that works in the presence of RLC segmentation, PDCP functions need to be changed.

Alternative 2: Retain the RLC context for a period of time after the burst transmission completes. This approach to a solution has the following impacts:

The period of time should be long enough to cover any possible retransmission time, e.g., more than a maximum amount of time within which a retransmission of an RLC PDU due to a lost acknowledgement is possible;

Fairly tight synchronization between the UE and the CN is needed, otherwise a new burst transmission may be sent from the UE before the CN's timer expires, and mistakenly associated with an old context; and A minimum delay time between burst transmissions is forced, which may be long, depending on RLC settings.

Alternative 3: New information is added to support maintaining state information.

The addition of new information to support maintaining state information may involve more than just simply indicating the initial and/or final (or equivalently, first and/or last) PDU of a burst transmission, because the out-of-sync problem still occurs in a single PDU scenario. The addition of new information may include:

Using an explicit release command, such as an RRCConnectionRelease command.

However, the explicit release command is counter to the connectionless concept;

Furthermore, both sides of burst transmission must maintain their contexts until a bidirectional handshake completes;

A three-step exchange is needed, like the radio resource control (RRC) Release Request-Release Accept-Release Complete triplet; and The explicit release command would incur too much overhead and is not reliable in environments with fragile radio links, such as those operating at frequencies above 5 GHz. Substantially, this approach would comprise using an RRC connection with conventional procedures instead of a reduced-impact connectionless transmission.

A session ID and/or transaction ID for a burst transmission is established and included in the transmission, e.g., as part of the RLC header.

Both sides of the burst transmission store or remember recently used identifier values, even after the RLC states have been released;

A late retransmission will include a stale or old identifier in the RLC header;

The receiver recognizes the stale identifier and may send an acknowledgment, but does not forward the late retransmission to higher layers; and A limited amount of persistent information (that could be described as a "mini-connection") is setup, but without context and setup signaling, such as associated with a RRC connection. The embodiments described below relate to this form of solution.

According to an example embodiment, information supporting the maintenance of state information is added to PDUs. As an illustrative example, the information includes a new transmission identifier T_ID is included in the initial RLC PDU of a session (i.e., a burst transmission). The newness of the T_ID may be defined based on a sliding window on a list of possible T_IDs or a timer that is scoped to a particular pair of devices participating in the burst transmission, such that a particular value of T_ID is not reused between the same pair of devices until the timer expires. As an example, the timer needs to be longer in duration than the maximum possible retransmission time. However, the timer does not preclude the starting of a new burst transmission with another new T_ID, and thus does not force a minimum delay time between successive burst transmissions. New RLC resources, such as a new RLC entity and/or a new RLC context, are established at the endpoints of the communication to support the new T_ID. Other RLC PDUs of the burst transmission also include the information, such as the new T_ID. As a result, a device receiving a single RLC PDU may be able to identify by the T_ID what transmission the PDU is part of, even if it does not contain other information such as a PDCP SN.

According to an example embodiment, a device receiving a transmission with the new T_ID will establish new RLC resources, such as a new RLC entity and/or a new RLC context, associated with the new T_ID. An ARQ mechanism, such as RLC AM, operates as usual within the new RLC resources. It is noted that an initial RLC PDU indication is used. An explicit flag in the RLC header or an implicit indication may be used as the initial RLC PDU indication. As an example, a RLC SN=1 (or some other distinguished value) is used as the initial RLC PDU indication.

According to an example embodiment, associated RLC resources, such as the RLC entities and/or the RLC context, are deleted when the burst transmission ends, but the T_ID is stored or remembered. The T_ID is stored or remembered for a period of time, for example. A sliding window technique may be used. The detection of the end of the burst transmission uses a final RLC PDU indication, which may be implemented as an explicit flag in the RLC header or an implicit indication. Acknowledgements may be sent after the final RLC PDU and the final RLC PDU indication may serve as an implicit poll causing such acknowledgements to be sent. The device receiving the final RLC PDU may automatically send a status PDU, prior to releasing or deleting the RLC resources, for example.

According to an example embodiment, receiving a data RLC PDU with an old T_ID is an error condition. The error condition may be answered with an indication, such as an already completed session indication. The use of the indication helps to prevent additional retransmission. The indication may also serve as an acknowledgement of the receipt of the final RLC PDU. Alternatively, the error condition may be ignored at the receiver, resulting in sending an acknowledgement indication, for instance, an RLC STATUS PDU, for the data RLC PDU.

According to an example embodiment, the final RLC PDU of a session (i.e., a burst transmission) includes an indication indicating it is the final RLC PDU of the session. The indication may be referred to as a final RLC PDU indication and is part of the information supporting the maintenance of state information. A receiving device receiving a RLC PDU with the final RLC PDU indication may delete or release RLC resources associated with the T_ID (also included with the RLC PDU).

Figures 5, 6:
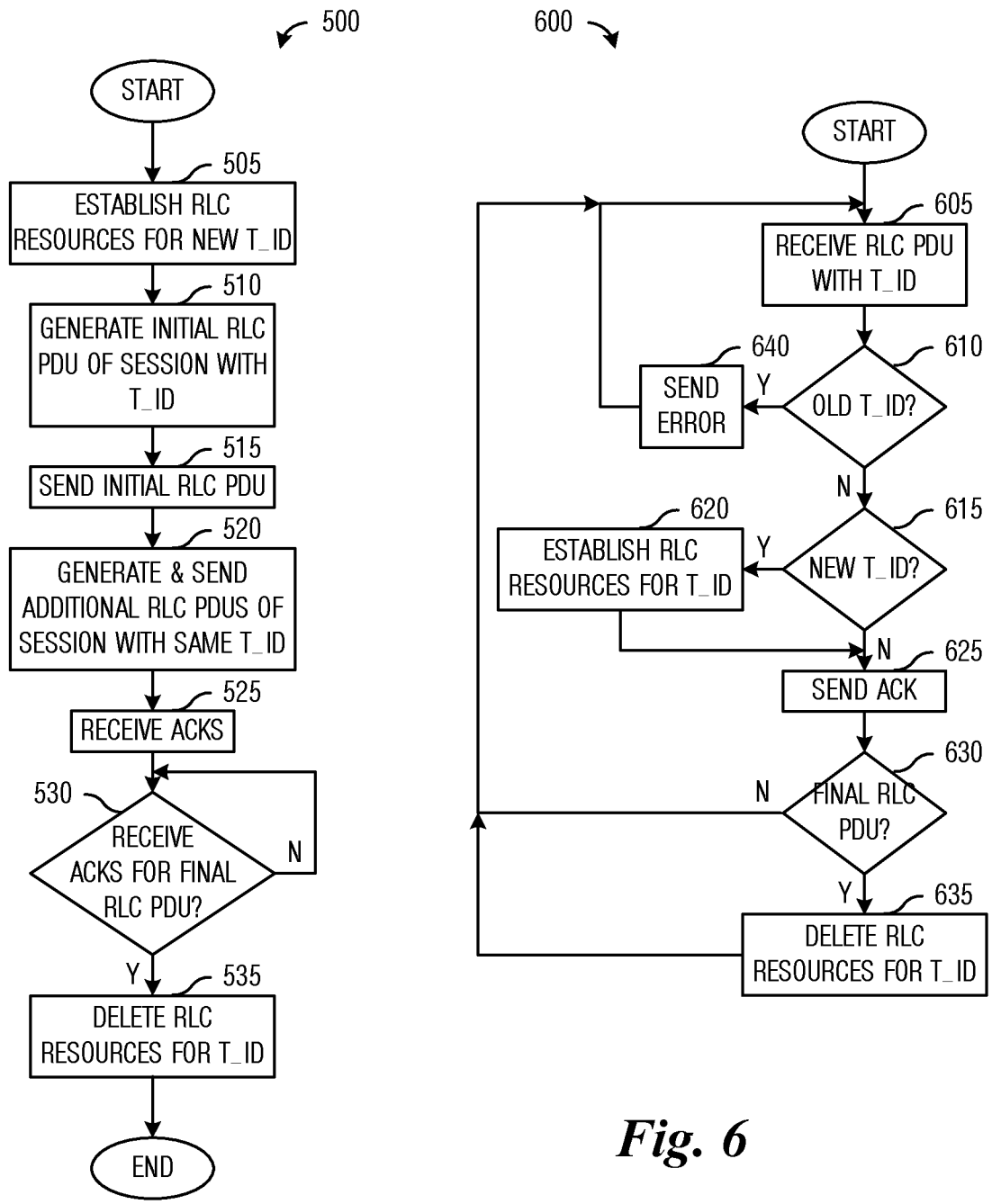
FIG. 5 illustrates a flow diagram of example operations occurring in a transmitting device according to embodiments presented herein.
FIG. 6 illustrates a flow diagram of example operations occurring in a receiving device according to embodiments presented herein.

FIG. 5 illustrates a flow diagram of example operations 500 occurring in a transmitting device. Operations 500 may be indicative of operations occurring in a sending device, such as a UE in an uplink burst transmission or an access node in a downlink burst transmission, as the sending device uses additional information in PDUs to facilitate maintenance of state information.

Operations 500 begin with the sending device establishing RLC resources, such as an RLC entity and/or an RLC context, for a new T_ID (block 505). The new T_ID is associated with a new session (i.e., a new burst transmission) being sent by the sending device. The sending device generates an initial RLC PDU of the session, the initial RLC PDU including the new T_ID (block 510). The sending device sends the initial RLC PDU to the receiving device (block 515). The sending device generates and sends additional RLC PDUs as needed for the burst transmission (block 520). The additional RLC PDUs also include the new T_ID. The final RLC PDU of the burst transmission also includes a final RLC PDU indication (in addition to the new T_ID), as discussed previously. The sending device receives acknowledgements for the RLC PDUs (block 525). In some example embodiments, the sending device requests the acknowledgements by sending a message, such as a poll message, to the receiving device. In other example embodiments, the receiving device automatically sends acknowledgements for the RLC PDUs received, as long as the T_ID included in the RLC PDUs is correct. The sending device performs a check to determine if an acknowledgement for the final RLC PDU has been received (block 530). If the acknowledgement for the final RLC PDU has been received, the sending device deletes or releases RLC resources associated with the T_ID (block 535). If the acknowledgement for the final RLC PDU has not been received, the sending device returns to block 530 to wait for the acknowledgement. A time out mechanism or a number of times the sending device checks to determine if the acknowledgment has been received may be implemented to prevent the sending device from waiting an extended amount of time for the acknowledgement.

In a first aspect, the present application provides a method for operating a transmitting device. The method includes establishing, by the transmitting device, a RLC resource associated with a T_ID of a burst transmission, sending, by the transmitting device, a first PDU of the burst transmission, the first PDU includes the T_ID and a final PDU indication indicating that the first PDU is a final PDU of the burst transmission, and releasing, by the transmitting device, the RLC resource associated with the T_ID when the transmitting device receives one of an acknowledgement for the first PDU or an error indication associated with the burst transmission.

According to a first embodiment of the method according to the first aspect, the method includes sending, by the transmitting device, a second PDU of the burst transmission, the second PDU including the T_ID. According to a second embodiment of the method according to any preceding embodiment of the first aspect or the first aspect as such, the second PDU further includes an initial PDU indication indicating that the second PDU is an initial PDU of the burst transmission. According to a third embodiment of the method according to any preceding embodiment of the first aspect or the first aspect as such, the transmitting device includes one of a UE in an uplink burst transmission or an access node in a downlink burst transmission.

FIG. 6 illustrates a flow diagram of example operations 600 occurring in a receiving device. Operations 600 may be indicative of operations occurring in a receiving device, such as an access node in an uplink burst transmission or a UE in a downlink burst transmission, as the receiving device uses additional information in PDUs to facilitate maintenance of state information.

Operations 600 begin with the receiving device receiving an RLC PDU including a T_ID (block 605). The receiving device performs a check to determine if the T_ID included in the RLC PDU is an old T_ID (block 610). As discussed previously, a T_ID is old if the T_ID has been used in an already completed burst transmission before expiration of a sliding window or a timer. If the T_ID included in the RLC PDU is not old, the receiving device performs another check to determine if the T_ID is a new T_ID (block 615). The T_ID is a new T_ID if the T_ID has not been used in another burst transmission prior to expiration of a sliding window or a timer. In other words, the T_ID is a new T_ID if the T_ID has not been used recently. If the T_ID is a new T_ID, the receiving device establishes RLC resources, e.g., an RLC entity and/or an RLC context, for the T_ID (block 620). If the T_ID is not a new T_ID (for instance, if it belongs to a currently ongoing burst transmission), or after the receiving device establishes RLC resources for the T_ID, the receiving device sends an acknowledgement (block 625). In some example embodiments, the receiving device sends the acknowledgement after receiving a message, such as a poll message or a message containing a polling indication, from the sending device. In other example embodiments, the receiving device automatically sends the acknowledgement after receiving an RLC PDU that does not include an old T_ID. The receiving device performs another check to determine if the RLC PDU is the final RLC PDU of the burst transmission (block 630). As discussed previously, the final RLC PDU includes a final RLC PDU indication in addition to the T_ID. If the RLC PDU is the final RLC PDU of the burst transmission, the receiving device deletes or releases RLC resources associated with the T_ID (block 635) and returns to block 605 to receive additional RLC PDUs. If the RLC PDU is not the final RLC PDU of the burst transmission, the receiving device returns to block 605 to receive additional RLC PDUs. If the T_ID is an old T_ID (block 610), the receiving device sends an error indication to the sending device (block 640) and returns to block 605 to receive additional RLC PDUs. In addition to the error indication, the receiving device may send an acknowledgement for the RLC PDU with the old T_ID.

In a second aspect, the present application provides a method for operating a receiving device. The method includes receiving, by the receiving device, a first PDU of a first burst transmission, the first PDU including a first T_ID associated with the first burst transmission, and the first PDU further including a final PDU indication indicating that the first PDU is a final PDU of the first burst transmission, and releasing, by the receiving device, a first RLC resource associated with the first T_ID when the first RLC resource associated with the first T_ID exists.

According to a first embodiment of the method according to the second aspect, the method includes sending, by the receiving device, an acknowledgement for the first PDU. According to a second embodiment of the method according to any preceding embodiment of the second aspect or the second aspect as such, the method includes receiving, by the receiving device, a second PDU of a second burst transmission, the second PDU including a second T_ID associated with the second burst transmission, establishing, by the receiving device, a second RLC resource associated with the second T_ID when the second T_ID is a new T_ID, and indicating, by the receiving device, an error condition when the second T_ID is an old T_ID and when the second T_ID does not have an associated RLC resource. According to a third embodiment of the method according to any preceding embodiment of the second aspect or the second aspect as such, the method includes updating, by the receiving device, the second T_ID as an old T_ID. According to a fourth embodiment of the method according to any preceding embodiment of the second aspect or the second aspect as such, the first burst transmission and the second burst transmission are one and the same. According to a fifth embodiment of the method according to any preceding embodiment of the second aspect or the second aspect as such, the method includes sending, by the receiving device, an acknowledgement for the second PDU. According to a sixth embodiment of the method according to any preceding embodiment of the second aspect or the second aspect as such, the acknowledgement and the error condition are sent in a single PDU. According to a seventh embodiment of the method according to any preceding embodiment of the second aspect or the second aspect as such, establishing the second RLC resource includes establishing an RLC entity associated with the second burst transmission. According to an eighth embodiment of the method according to any preceding embodiment of the second aspect or the second aspect as such, the receiving device includes one of a UE in a downlink burst transmission or an access node in an uplink burst transmission.

Figure 7:
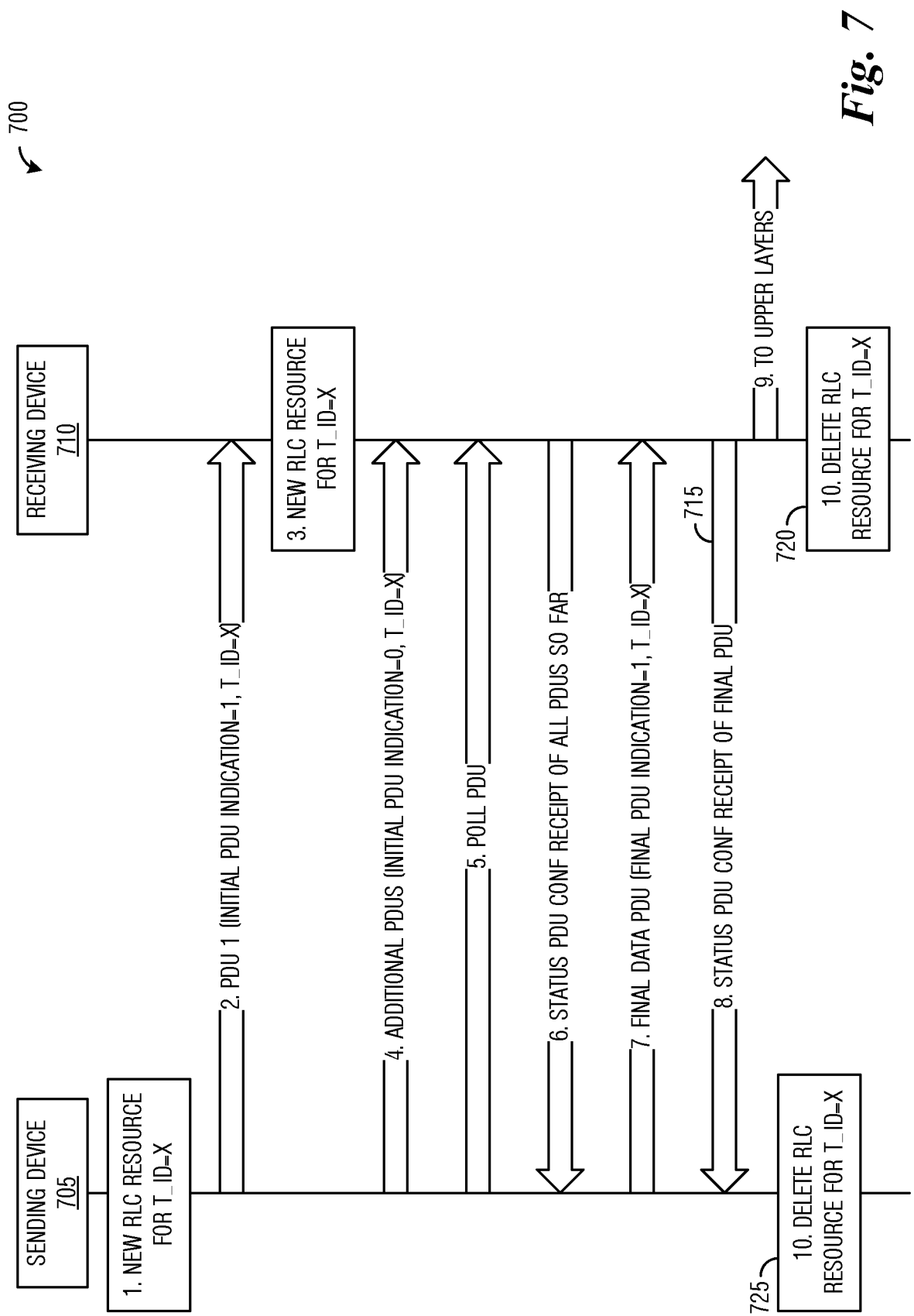
FIG. 7 illustrates a diagram of messages exchanged and processing performed during a burst transmission wherein the RLC PDUs exchanged include additional information to facilitate maintenance of state information according to embodiments presented herein.

FIG. 7 illustrates a diagram 700 of messages exchanged and processing performed during a burst transmission wherein the RLC PDUs exchanged include additional information to facilitate maintenance of state information. Diagram 700 illustrates messages exchanged and processing performed by a sending device 705 and a receiving device 710 when no transmission errors occur.

The initial processing and transmissions shown in FIG. 7 are as discussed previously and not repeated here. As shown in FIG. 7, after receiving device 710 sends an acknowledgment corresponding to the final RLC PDU of the burst transmission (event 715), receiving device 710 sends information contained in the burst transmission to upper layers and deletes the RLC resource associated with T_ID (block 720). After sending device 705 receives the acknowledgment corresponding to the final RLC PDU, sending device 705 deletes the RLC resource associated with T_ID (block 725).

Figure 8:
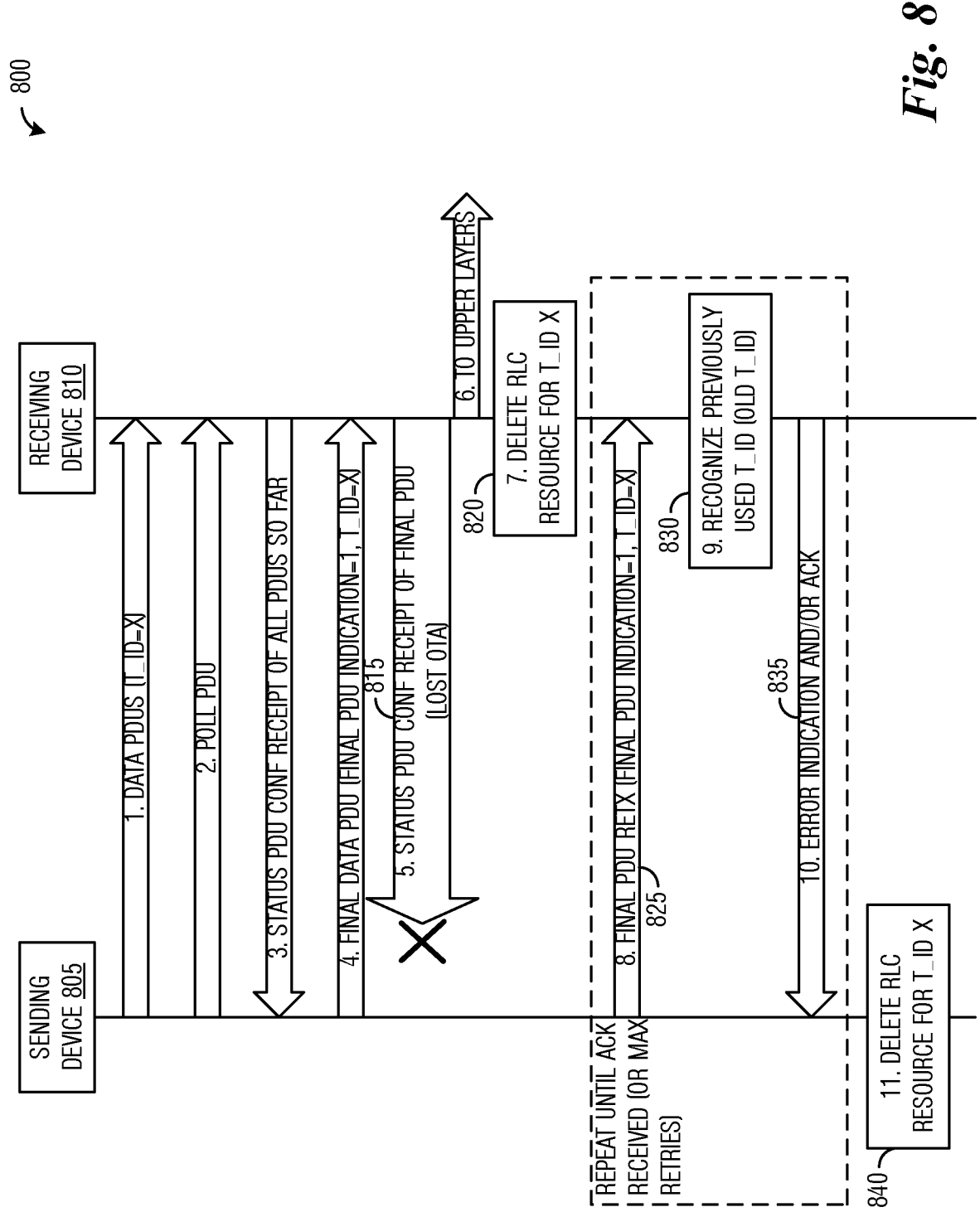
FIG. 8 illustrates a diagram of messages exchanged and processing performed during a burst transmission wherein the RLC PDUs exchanged include additional information to facilitate maintenance of state information, highlighting an example handling of an error condition according to embodiments presented herein.

FIG. 8 illustrates a diagram 800 of messages exchanged and processing performed during a burst transmission wherein the RLC PDUs exchanged include additional information to facilitate maintenance of state information, highlighting an example handling of an error condition. Diagram 800 illustrates messages exchanged and processing performed by a sending device 805 and a receiving device 810 when a transmission error occurs.

The initial processing and transmissions shown in FIG. 8 are as discussed previously and not repeated here. As shown in FIG. 8, receiving device 810 sends an acknowledgment corresponding to the final RLC PDU of the burst transmission (event 815). However, the acknowledgment is lost and not received by sending device 805. After sending the acknowledgement, receiving device 810 forwards information contained in the burst transmission to upper layers and deletes the RLC resource associated with T_ID (block 820). Sending device 805 does not receive the acknowledgment corresponding to the final RLC PDU, so sending device 805 resends the final RLC PDU (event 825). The final RLC PDU includes the same T_ID of other RLC PDUs of the burst transmission. Receiving device 810 receives the final RLC PDU with the T_ID and recognizes the final RLC PDU as including an old T_ID (block 830). Receiving device 810 sends an error indication to sending device 805 (event 835). The error indication may also include an acknowledgement for the final RLC PDU. Alternatively, receiving device 810 could omit the error indication and only send an acknowledgement for the final RLC PDU. Upon receipt of the error indication, or when it determines that all PDUs of the transmission have been acknowledged, sending device 805 deletes the RLC resource associated with T_ID (block 840).

Figure 9:
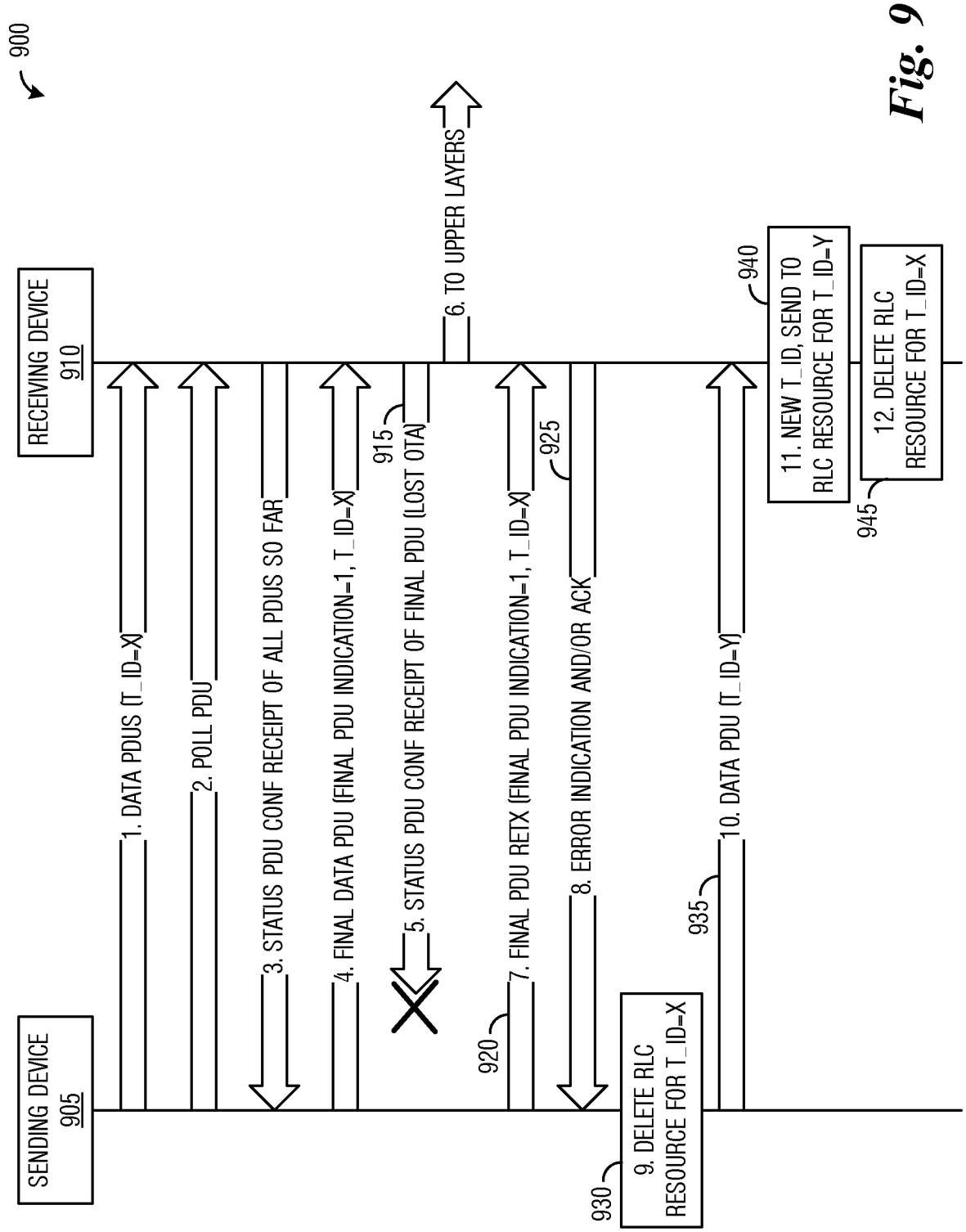
FIG. 9 illustrates a diagram of messages exchanged and processing performed during a burst transmission wherein the RLC PDUs exchanged include additional information to facilitate maintenance of state information, highlighting a receiving device maintaining RLC resources for an extended amount of time to handle retransmissions according to embodiments presented herein.

FIG. 9 illustrates a diagram 900 of messages exchanged and processing performed during a burst transmission wherein the RLC PDUs exchanged include additional information to facilitate maintenance of state information, highlighting a receiving device maintaining RLC resources for an extended amount of time to handle retransmissions. Diagram 900 illustrates messages exchanged and processing performed by a sending device 905 and a receiving device 910.

The initial processing and transmissions shown in FIG. 9 are as discussed previously and not repeated here. As shown in FIG. 9, receiving device 910 sends an acknowledgment corresponding to the final RLC PDU of the burst transmission (event 915) that is lost in transmission and is not received by sending device 905. Unlike the scenario illustrated in FIG. 8, receiving device 910 does not immediately delete RLC resources associated with the T_ID of the final RLC PDU. Sending device 905 resends the final RLC PDU with the same T_ID (e.g., T_ID=X) (event 920). Receiving device 910 receives the resent final RLC PDU with T_ID=X, and noting that the final RLC PDU was previously received and acknowledged. Therefore, an error has occurred. Receiving device 910 sends an error indication to sending device 905 (event 925). The error indication may also include an acknowledgement for the final RLC PDU. Upon receipt of the error indication, sending device 905 deletes the RLC resource associated with T_ID=X (block 930). At some later time, sending device 905 sends an RLC PDU with a different T_ID (e.g., T_ID=Y) to receiving device 910 (event 935). It is noted that event 935 may occur at any time after event 925, but not so long that receiving device 910 has deleted RLC resources for T_ID=X. Receiving device 910 determines that T_ID=Y is a new T_ID so a new RLC resource is established for T_ID=Y (block 940). Receiving device 910 deletes the RLC entity associated with T_ID=X (block 945).

According to an example embodiment, the transmission ID for each burst transmission is selected by the sending device, with both the sending device and the receiving device considering that the transmission ID is scoped for the device pair (the sending device and the receiving device). In other words, different device pairs may use the same transmission IDs without collision. As an illustrative example, a first UE-access node pair and a second UE-access node pair, where the access node is the same in both pairs, can use the same transmission ID without collision. It is suggested that in an uplink burst transmission, an identifier of the UE (the sending device) be conveyed to the access node. Alternatively, the sending device may send a freshness parameter, such as a nonce or a time based value, as part of the transmission ID.

According to an example embodiment, validity of the transmission ID is checked based on a windowing system. Both devices of a device pair maintain a list (or equivalently a bitmap or similar representation) of transmission IDs used between the devices. Then, when starting a new burst transmission, the sending device checks to determine if the list is empty. If the list is empty, the sending device may pick an arbitrary transmission ID. If the list is not empty, the sending device may pick the lowest transmission ID not already used for the transmission ID of the burst transmission and update the list.

When a RLC PDU is received with a transmission ID of a burst transmission not already in progress, the receiving device checks to determine if the transmission ID is in the list. If the transmission ID is in the list, the receiving device treats the RLC PDU as a repetition from a previous burst transmission. If the transmission ID is not in the list, the receiving device establishes new RLC resources associated with the transmission ID and updates the list.

Updating the list may be performed as follows:
A current transmission ID is marked as used in the list, and
A number W of transmission IDs in the list are marked as unused, where W=window size.

The example embodiments may have the following impact on RLC:
The transmission ID is added to data PDU formats used for burst transmissions, with the following impacts:
Potential backward compatibility issues with 3GPP LTE,
May imply that burst transmissions use a variant of AM with different formats,
Alternatively, a new protocol may be designed with the transmission ID in the header.
The initial PDU and final PDU indications are added to data PDU formats, with the following impacts:
Additional header bits are needed, which may not be readily available in the current 3GPP LTE acknowledged mode data (AMD) header format,
In a new protocol, the indication bits may be designed from the beginning.
A new PDU type (or flag in status PDU) indicating an invalid transmission ID is optional;
May be avoided through the use of a normal acknowledgement without an error indication,
May not provide much information about the error or error type, for example.
Management procedures for transmission ID values are added.

Figure 10:
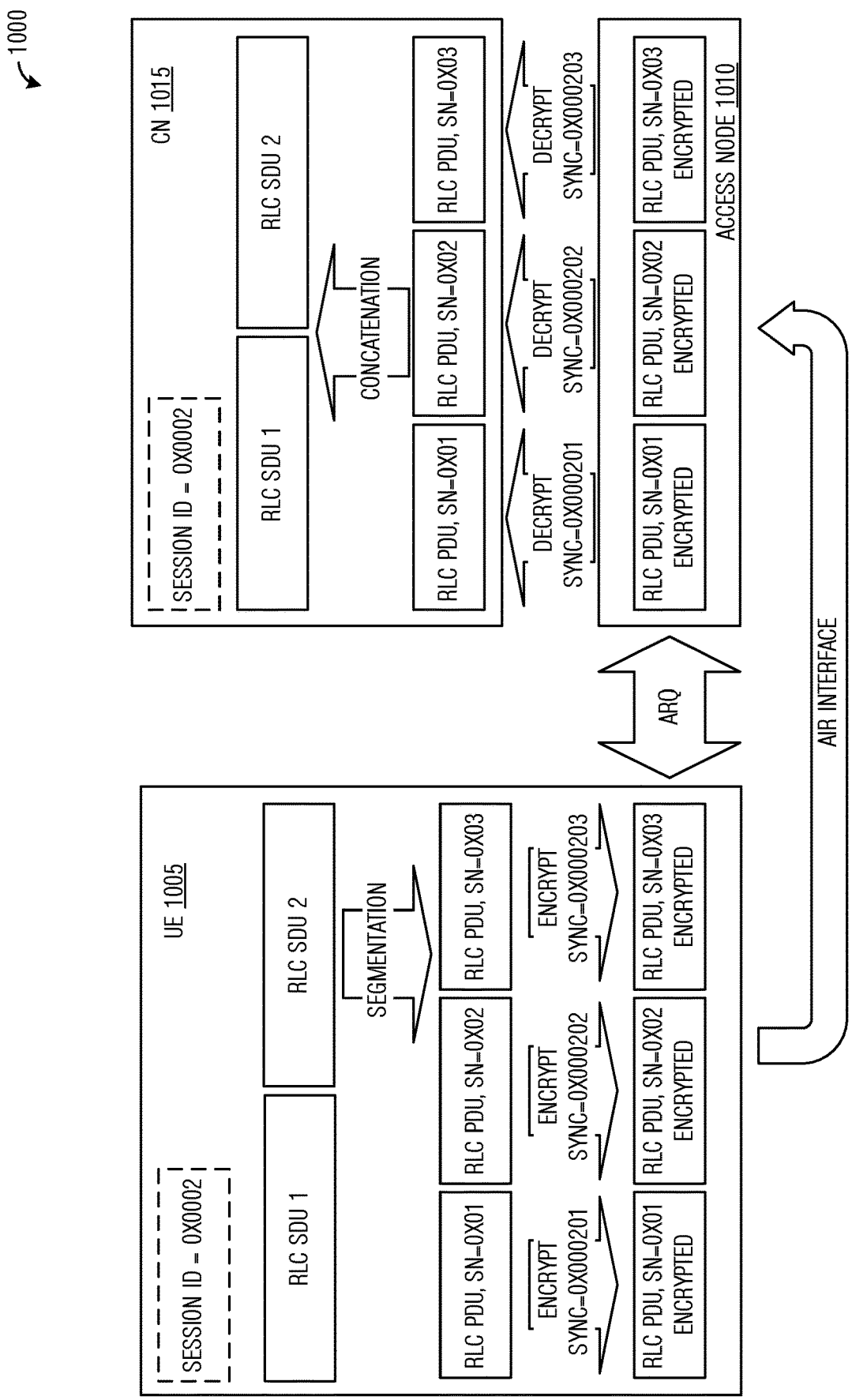
FIG. 10 illustrates a detailed view of an example data flow in an uplink burst transmission highlighting a long burst transmission according to embodiments presented herein.

FIG. 10 illustrates a detailed view of an example data flow 1100 in an uplink burst transmission highlighting a relatively long burst transmission that requires segmentation into multiple RLC PDUs to transmit over the air. Data flow 1100 involves data moving from a UE 1005 to an access node 1010 and ending at a CN 1015. As shown in FIG. 10, there is a sufficient amount of data in the burst transmission to require segmentation of the data into multiple blocks, each of which may be transmitted as a separate RLC PDU. In this situation it is still necessary to avoid cryptosync reuse. Cryptosync reuse is a situation when a value used as the cryptosync repeats, leading to problems such as vulnerability to decryption by an attacker who obtains two blocks of data encrypted with the same key and the same cryptosync.

Cryptosync reuse arises when the amount of data being transmitted is too large or if the individual blocks of data for encryption, e.g., PDUs of the protocol layer that performs the encryption, are too small. One way to avoid cryptosync reuse when a large amount of data is involved is to segment the data into multiple smaller parts, with each part being small enough so that the cryptosync can be relied upon to not repeat. As an illustrative example, in a system where encryption is a function of the RLC layer and the RLC SN is used as a cryptosync, the parts (e.g., RLC SDUs) could be sized so as to produce a number of RLC PDUs that will not cause the RLC SN to repeat. In such an example, if the amount of data in a part is small enough so that the RLC SN of the RLC PDUs in the burst transmission of the part does not repeat, then a possible cryptosync may be expressed as: transmission ID+RLC SN, where the transmission ID changes for each RLC SDU. Thus, each RLC SDU gives rise to a sequence of cryptosync values that never repeat because they are distinguished from one another by RLC SN, and between different RLC SDUs the cryptosync values will not repeat because they are distinguished from one another by transmission ID. This technique may be visualized as combining PDCP with RLC segmentation in an upper RLC sublayer. Alternatively, the technique may be visualized as moving segmentation and duplicate detection into PDCP. In some embodiments, the transmission ID may be omitted if the RLC SN, which in this case is the PDCP SN, by itself is long enough to avoid frequent RLC SN rollover. An upper Layer 2 entity located in a CN and/or UE may be used for re-ordering, as well as encrypting and/or decrypting the information. Infrequent cases of RLC SN rollover may be handled with a rekeying or similar procedure, so that reuse of the same cryptosync with the same key never occurs. In this case, for purposes of cryptosync management, each UE context in CN 1015 is considered as one continuous session.

In a third aspect, the present application provides a receiving device. The receiving device includes a processor, and a computer readable storage medium storing programming for execution by the processor. The programming including instructions to configure the receiving device to receive a first PDU of a first burst transmission, the first PDU includes a first T_ID associated with the first burst transmission, and the first PDU further includes a final PDU indication indicating that the first PDU is a final PDU of the first burst transmission, and release a first RLC resource associated with the first T_ID when the first RLC resource associated with the first T_ID exists.

According to a first embodiment of the transmitting device according to the third aspect, the programming includes instructions to configure the receiving device to send an acknowledgement for the first PDU. According to a second embodiment of the transmitting device according to any preceding embodiment of the third aspect or the third aspect as such, the programming includes instructions to configure the receiving device to receive a second PDU of a second burst transmission, the second PDU including a second T_ID associated with the second burst transmission, establish a second RLC resource associated with the second T_ID when the second T_ID is a new T_ID, and indicate an error condition when the second T_ID is an old T_ID and when the second T_ID does not have an associated RLC resource. According to a third embodiment of the transmitting device according to any preceding embodiment of the third aspect or the third aspect as such, the programming includes instructions to configure the receiving device to update the second T_ID as an old T_ID. According to a fourth embodiment of the transmitting device according to any preceding embodiment of the third aspect or the third aspect as such, the programming includes instructions to configure the receiving device to send an acknowledgement for the second PDU.

In a fourth aspect, the present application provides a transmitting device. The transmitting device includes a processor, and a computer readable storage medium storing programming for execution by the processor. The programming including instructions to configure the transmitting device to establish a RLC resource associated with a T_ID of a burst transmission, send a first PDU of the burst transmission, the first PDU includes the T_ID, and a final PDU indication indicating that the first PDU is a final PDU of the burst transmission, and release the RLC resource associated with the T_ID when the transmitting device receives one of an acknowledgement for the first PDU or an error indication associated with the burst transmission.

According to a first embodiment of the receiving device according to the fourth aspect, the programming includes instructions to configure the transmitting device to send a second PDU of the burst transmission, the second PDU includes the T_ID.

Figure 11:
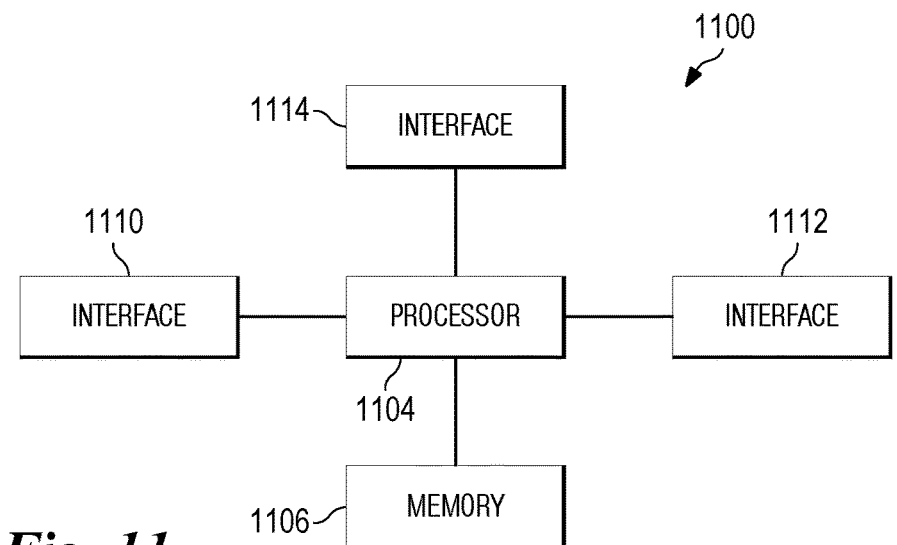
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in Figure ii. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in Figure ii, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
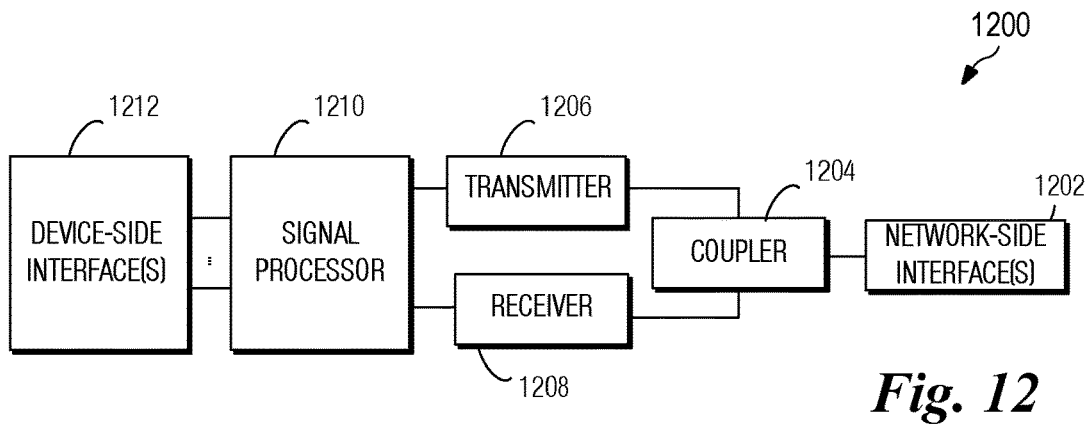
FIG. 12 illustrates a block diagram of a transceiver adapted to transmit and receive signaling over a telecommunications network according to embodiments presented herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device. Although the present disclosure and its advantages have been described in detail, it should be understood that various changes, substitutions and alterations can be made herein without departing from the spirit and scope of the disclosure as defined by the appended claims.

What is claimed is:

1. A method for operating a receiving device, the method comprising:

receiving, by the receiving device, a first protocol data unit (PDU) of a first service data unit (SDU) transmission, the first PDU including a first transmission identifier (T_ID) associated with the first SDU transmission, and including an initial PDU indication indicating that the first PDU is an initial PDU of the first SDU transmission;

establishing, by the receiving device, a first radio link control (RLC) entity supporting the first SDU transmission associated with the first T_ID; and receiving, by the receiving device at a different time than the first PDU, a second PDU of the first SDU transmission, the second PDU including the first T_ID associated with the first SDU transmission, and the second PDU further including a final PDU indication indicating that the second PDU is a final PDU of the first SDU transmission.

2. The method of claim 1, further comprising sending, by the receiving device, an acknowledgement for the first PDU.

3. The method of claim 2, wherein the acknowledgement of the first PDU and an error condition are sent in a single PDU.

4. The method of claim 1, further comprising:
receiving, by the receiving device, a third PDU of a second SDU transmission, the third PDU including a second T_ID associated with the second SDU transmission; and
indicating, by the receiving device, an error condition in response to the second T_ID being an old T_ID.

5. The method of claim 4, further comprising updating, by the receiving device, the second T_ID as old.

6. The method of claim 4, wherein the first SDU transmission and the second SDU transmission are one and the same.

7. The method of claim 4, further comprising sending, by the receiving device, an acknowledgement for the third PDU.

8. The method of claim 1, wherein the receiving device comprises one of a user equipment (UE) in a downlink SDU transmission or an access node in an uplink SDU transmission.

9. A method for operating a transmitting device, the method comprising:
establishing, by the transmitting device, a radio link control (RLC) entity supporting a service data unit (SDU) transmission associated with a transmission identifier (T_ID) of the SDU transmission;
sending, by the transmitting device, a first protocol data unit (PDU) of the SDU transmission, the first PDU including the T_ID, and including an initial PDU indication indicating that the first PDU is an initial PDU of the SDU transmission;
sending, by the transmitting device at a different time than the first PDU, a second PDU of the SDU transmission, the second PDU including the T_ID, and including a final PDU indication indicating that the second PDU is a final PDU of the SDU transmission; and
in response to not receiving an acknowledgement for the second PDU, resending, by the transmitting device, the second PDU of the SDU transmission.

10. The method of claim 9, wherein the transmitting device comprises one of a user equipment (UE) in an uplink SDU transmission or an access node in a downlink SDU transmission.

11. A receiving device comprising:
a non-transitory memory storage comprising instructions; and
one or more processors in communication with the non-transitory memory storage, wherein the one or more processors execute the instructions to:
receive a first protocol data unit (PDU) of a first service data unit (SDU) transmission, the first PDU including a first transmission identifier (T_ID) associated with the first SDU transmission, and including an initial PDU indication indicating that the first PDU is an initial PDU of the first burst SDU transmission;
establish a first radio link control (RLC) entity supporting the first SDU transmission associated with the first T_ID; and
receive, at a different time than the first PDU, a second PDU of the first SDU transmission, wherein the second PDU includes the first T_ID associated with the first SDU transmission, and wherein the second PDU further includes a final PDU indication indicating that the second PDU is a final PDU of the first SDU transmission.

12. The receiving device of claim 11, wherein the one or more processors execute the instructions to send an acknowledgement for the first PDU.

13. The receiving device of claim 12, wherein the acknowledgement of the first PDU and an error condition are sent in a single PDU.

14. The receiving device of claim 11, wherein the one or more processors execute the instructions to:
receive a third PDU of a second SDU transmission, the third PDU including a second T_ID associated with the second SDU transmission;
indicate an error condition in response to the second T_ID being an old T_ID.

15. The receiving device of claim 14, wherein the one or more processors execute the instructions to update the second T_ID as old.

16. The receiving device of claim 14, wherein the one or more processors execute the instructions to send an acknowledgement for the third PDU.

17. The receiving device of claim 14, wherein the first SDU transmission and the second SDU transmission are one and the same.

18. The receiving device of claim 11, wherein the receiving device comprises one of a user equipment (UE) in a downlink SDU transmission or an access node in an uplink SDU transmission.

19. A transmitting device comprising:
a non-transitory memory storage comprising instructions; and
one or more processors in communication with the non-transitory memory storage, wherein the one or more processors execute the instructions to:
establish a radio link control (RLC) entity supporting a service data unit (SDU) transmission associated with a transmission identifier (T_ID) of the SDU transmission;
send, by the transmitting device, a first protocol data unit (PDU) of the SDU transmission, the first PDU including the T_ID, and including an initial PDU indication indicating that the first PDU is an initial PDU of the SDU transmission;
send, at a different time than the first PDU, a second PDU of the SDU transmission, wherein the second PDU includes the T_ID, and includes a final PDU indication indicating that the second PDU is a final PDU of the SDU transmission; and
in response to not receiving an acknowledgement for second PDU, resend the second PDU of the SDU transmission.

20. The transmitting device of claim 19, wherein the transmitting device comprises one of a user equipment (UE) in an uplink SDU transmission or an access node in a downlink SDU transmission.

* * * * *

UNITED STATES PATENT AND TRADEMARK OFFICE
CERTIFICATE OF CORRECTION

PATENT NO. : 10,979,934 B2
APPLICATION NO. : 16/691939
DATED : April 13, 2021
INVENTOR(S) : Nathan Edward Tenny et al.

It is certified that error appears in the above-identified patent and that said Letters Patent is hereby corrected as shown below:

In the Claims

In Column 18, Line 2, Claim 11, delete "burst".

In Column 18, Line 23, Claim 14, delete "SDU transmission;" and insert --SDU transmission; and--.

Signed and Sealed this
Seventh Day of September, 2021

Drew Hirshfeld
*Performing the Functions and Duties of the
Under Secretary of Commerce for Intellectual Property and
Director of the United States Patent and Trademark Office*